H. M. BLACK.
APPARATUS FOR TESTING THE EYESIGHT.
APPLICATION FILED JUNE 30, 1911.
1,072,813.
Patented Sept. 9, 1913.
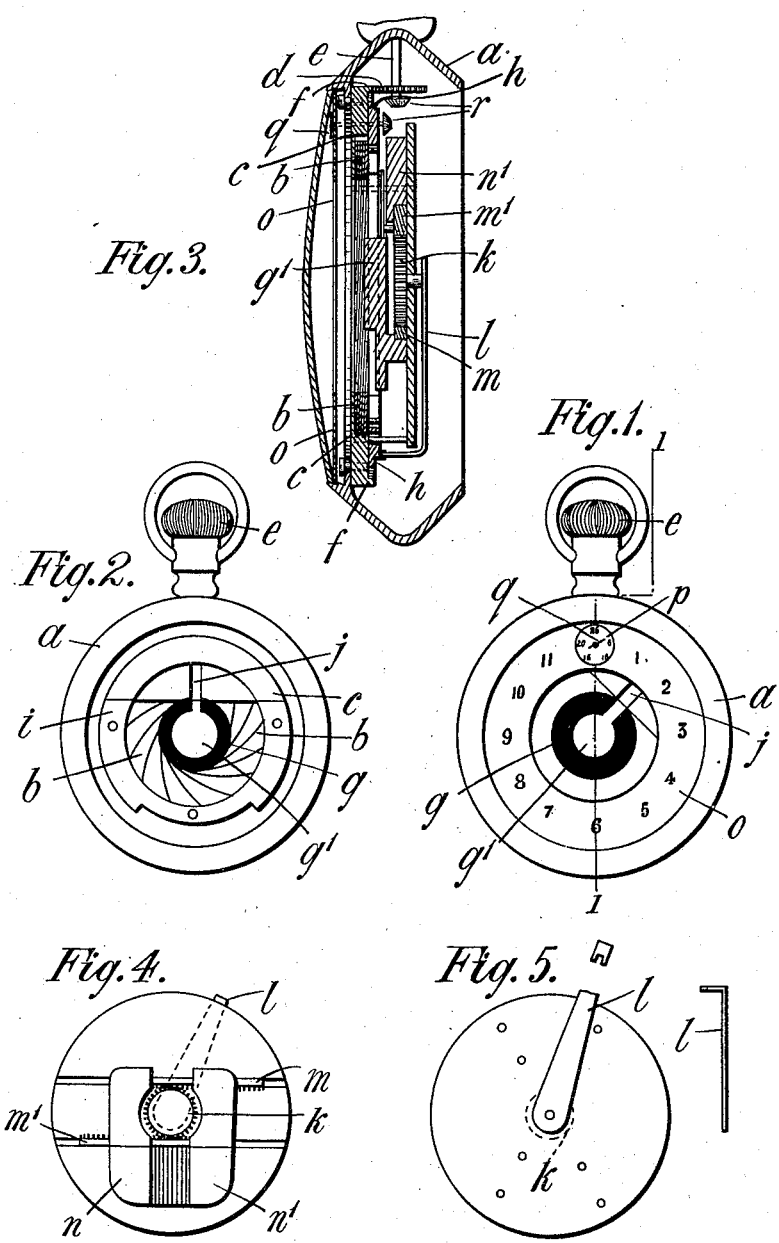

UNITED STATES PATENT OFFICE.

HUGH MILNER BLACK, OF BRIGHTON, ENGLAND.

APPARATUS FOR TESTING THE EYESIGHT.

1,072,813.  Specification of Letters Patent.  Patented Sept. 9, 1913.

Application filed June 30, 1911. Serial No. 636,225.

*To all whom it may concern:*

Be it known that I, HUGH MILNER BLACK, optician, of 16 New Steine, Brighton, Sussex, England, have invented new and useful Improvements Relating to Apparatus for Testing the Eyesight; and I do hereby declare that the following is a full, clear, and exact description of the same, reference being had to the accompanying drawings, forming a part hereof.

This invention has reference to apparatus for testing the eyesight and has for its object to provide improved means whereby the known means of testing the sight by the aid of an incomplete ring or line is utilized.

Recent research in ophthalmics has demonstrated that the most convenient standard test for vision is an incomplete ring of such size that from the eye of the observer the diameter of the ring subtends an angle of five minutes, the width of the ring subtending one minute and the interval in the ring being of the same width.

As is well known, vision is measured by the distance by which two points must be separated to be distinguished as separate points as compared with their distance from the observer. This is the visual angle. The incomplete ring or line, the person tested being required to determine in which direction it is incomplete, is an exact and extremely simple application of this principle and it is the object of my present invention to employ this principle in an improved manner.

With these ends in view my invention consists in providing a disk or plate with a ring or line inscribed thereon, the ring or line being either incomplete or rendered apparently incomplete by a movable interval, and in mounting the said disk or plate in such a manner that it may be rotated or moved against a dial or the like, bearing figures or signs of any description all as more particularly hereinafter described and finally pointed out in the claim.

In order that my invention may be readily understood and carried into effect I will now proceed to describe the same fully for which purpose reference is to be had to the accompanying drawings in which:—

Figure 1 is an elevation of one form of device embodying my invention and Fig. 2 a view of the same with the dial removed. Fig. 3 is a section on line 1—1 of Fig. 1. Fig. 4 is a front view of the parts underlying the iris diaphragm and Fig. 5 is a rear view of the same.

Referring to the form of the invention illustrated in Figs. 1 to 5 I provide a casing *a* which may conveniently be similar to a watch case. Within said casing *a* is mounted an iris diaphragm *b* in the casing *c* which is adapted to be rotated in casing *a* by means of the pinion *d* secured to and operated by the stem wind *e* to which end the casing *c* is provided with a toothed rim *f* gearing with said pinion in the position of the parts as shown in Fig. 3 so that upon turning the stem *e* the casing *c* will be turned within the casing *a* for a purpose to be hereinafter explained. The blades of the iris diaphragm *b* which are white are arranged over a black background *g* and are opened or closed by depressing the stem *e* in such a manner that the pinion *d* engages a toothed rim *h* (Fig. 3) when upon turning said stem *e* the blades of the iris diaphragm will open or close upon the white center *g'* so causing the width of the ring formed on the black background *g* to be varied. The break *j* in the ring is also varied in width in the following manner: Mounted in the center of the casing is a pinion *k* (Fig. 4) to which an arm *l* is rigidly secured the end of which engages with a stud secured to the rim *f*. Mounted on the iris diaphragm and arranged to gear with said pinion *k* are two racks *m m'* to which are secured two slides *n n'*. It will thus be seen that as the blades of the iris diaphragm are operated to alter the width of the ring *i* the slides *n n'* will be operated to vary the width of the break in the ring when there is relative movement between the rims *h* and *g*. By engaging the pinion *d* with toothed rim *f* and turning the stem *e* the whole of the casing *c* will be rotated within the casing *a* the person whose acuteness of vision is being tested being required to indicate in which direction the ring is broken and to facilitate this the dial *o* is provided with figures signs or letters as shown for example in Fig. 1.

What I do claim as my invention and desire to receive by Letters Patent is:—

An apparatus for testing eyesight comprising in combination, a casing, a circular support rotatively mounted in said casing and provided with a circular iris diaphragm, means for rotating said diaphragm and its support, said diaphragm comprising white blades and a black background disposed behind said blades and having a white center, mechanism adapted for operation by said means for opening or closing said blades to vary the size of the black background to be disclosed, said diaphragm having a radial interruption, and means for varying the size of such interruption, substantially as described.

In testimony whereof I affix my signature in presence of two witnesses.

HUGH MILNER BLACK.

Witnesses:
  GEO. PRINGLE,
  PERCIVAL H. CARTER.

Copies of this patent may be obtained for five cents each, by addressing the "Commissioner of Patents, Washington, D. C."